Nov. 30, 1965    R. W. BECK    3,220,496
OILFIELD LUBRICATING SUB
Filed Oct. 29, 1962    2 Sheets-Sheet 1

Robert W. Beck  INVENTOR.

BY James E. Reed
ATTORNEY

Robert W. Beck INVENTOR.

BY James E. Reed
ATTORNEY

United States Patent Office 3,220,496
Patented Nov. 30, 1965

3,220,496
OILFIELD LUBRICATING SUB
Robert W. Beck, Caracas, Venezuela, assignor, by mesne assignments, to Esso Production Research Company, Houston, Tex., a corporation of Delaware
Filed Oct. 29, 1962, Ser. No. 233,786
6 Claims. (Cl. 175—228)

This is a continuation-in-part of Serial No. 851,429, filed in the United States Patent Office on November 6, 1959 and now abandoned.

The present invention relates to the lubrication of bearings and is particularly concerned with an improved system for lubricating bearings on tools located in inaccessible places. In a particular embodiment, the invention relates to a system for supplying a lubricant to the bearings used on rock bits and similar tools employed in the petroleum industry.

Rock bits used in drilling oil wells, gas wells and similar boreholes are normally provided with conical cutting elements which rotate in contact with the formation at the bottom of the borehole. Each of these cutting elements or cones is supported on a cantilever pin by means of an internal bearing assembly. The assemblies utilized generally consist of a combination of sleeve, ball and roller bearings which are lubricated by packing the cones with grease before they are installed. Studies have shown that this grease is generally flushed out of the bearings by the drilling fluid during operation of the bit and that bearing failure due to insufficient lubrication normally occurs after only a few hours. This limits the footage obtained per bit and necessitates that the drill string be pulled from the borehole at frequent intervals. Bearing life could be extended significantly and drilling costs could therefore be reduced appreciably if a more effective lubricating system were available.

Several different methods for improving the lubrication of bearings used on rock bits and similar tools have been suggested in the past. One such method involves the use of a fluid-actuated piston or similar device to force oil or grease from a reservoir through an orifice into the bearing assemblies. Experience has shown, however, that the orifice employed to meter the oil or grease must be extremely small if the lubricant is to be supplied continuously over an extended period and that such an orifice is readily plugged by any sand, scale or other foreign matter present in the system. More complicated metering devices capable of discharging oil or grease at the required rates without plugging are generally impractical because of the extremely severe conditions under which rock bits must operate. An alternate approach has been to include an extreme pressure lubricant in the drilling fluid circulated to the bit and rely upon this to supply the required lubrication. This technique has obvious disadvantages because of the large quantities of lubricant which must be used in order to supply the small amount required by the bearings. Still another approach has been to employ seals between the cones and legs of the bit in order to retain the grease and prevent the entry of drilling fluid. The difficulties in developing a durable seal which will remain fluid-tight under borehole conditions are formidable. Because none of these systems has proved wholly satisfactory, virtually all rock bits in current use are operated without effective bearing lubrication.

It is therefore an object of the present invention to provide an improved system for the forced lubrication of bearings which because of their location or for other reasons are difficult to lubricate by conventional means. Another object is to provide a method for supplying a lubricant to the bearings of rock bits and similar tools at low flow rates over extended periods. A further object is to provide apparatus for the lubrication of rock bit bearing which will not be plugged by small particles of sand, scale or other foreign matter present in the system. Still other objects will become apparent as the invention is described in detail hereafter.

In accordance with the invention, it has now been found that many of the difficulties encountered in the past in lubricating the bearings on rock bits and similar tools can be avoided by utilizing a lubrication system in which the lubricant is forced into the bearings through an elongated tube of sufficient length to permit laminar flow at extremely low rates and of sufficient diameter to prevent plugging by small particles of sand, scale and other foreign matter. The use of such a tube makes possible continuous lubrication of the bearings over extended periods and at the same time eliminates practical difficulties encountered with earlier systems due to plugging. The result is an improvement in bearing life and a substantial reduction in the cost of operating and maintaining the equipment.

The dimensions of the tube utilized to restrict flow of the lubricant will depend upon the flow rate required for proper bearing lubrication, the energy available to force the lubricant through the tube, and the properties of the lubricant. In general, an internal tube diameter of from about 1 to about 3 millimeters and a length-to-internal diameter ratio between about 1,000:1 and about 10,000:1 will be required. The particular dimensions necessary for a given system can readily be calculated by means of the Poiseuille equation, set forth on page 248 of Mechanical Engineers Handbook by Lionel S. Marks, 5th edition, published by McGraw Hill Book Company, New York, New York (1951). This equation, equivalent to the Darcy equation of laminar flow, defines flow through a capillary tube as follows:

$$h_f/L = 0.0326(u/s)(V/D^2)$$

where:

$h_f$ = head loss in feet
$u$ = viscosity in poises
$s$ = specific gravity in grams per cubic centimeter
$D$ = diameter of tube in centimeters
$V$ = flow rate in centimeters per second
$L$ = length of tube in feet.

A typical application of the above equation to determine the restrictor tube dimensions to be utilized with a tricone rock bit containing 3 one-half inch nozzles through which drilling mud is discharged at a rate of 500 gallons per minute is as follows:

*Flow restrictor tube diameter*

The flow restrictor tube should have a minimum diameter of 1.0 millimeter in order to prevent plugging by fine sand grains, scale or other foreign matter which may be present in the system.

*Desired lubricant flow rate*

The lubricant must be supplied at the rate of 20 cubic centimeters per hour to each cone of the bit over a 50 hour period. The total lubricant required will be 60 cubic centimeters per hour. The flow rate through the 1.0 millimeter restrictor tube can therefore be calculated as follows:

$$V = \frac{60 \text{ cc./hr.}}{3600 \text{ sec./hr.}} \cdot \frac{4}{\pi (0.1 \text{ cm.})^2} = 2.13 \text{ cm./sec.}$$

*Pressure available for lubrication*

The mud flow rate is 500 gallons per minute. This is discharged through three jet nozzles ½ inch in diameter. It can be shown that the pressure drop across the bit should therefore be 650 pounds per square inch. This is equivalent to 1500 feet of hydraulic head.

Lubricant properties

The lubricant employed has a viscosity of 10.0 poises and a specific gravity of 1.0 gram per cubic centimeter.

Flow restrictor tube length

The required length of the flow restrictor tube will therefore be as follows:

$$L = h/(0.0326)(u/s)(V/D^2)$$
$$= 1500/(0.0326)(10/1.0)(2.13/0.01)$$
$$= 21.6 \text{ feet}$$

The above calculation shows that a tricone rock bit to be utilized under the conditions specified will require a flow restrictor tube having an internal diameter of 1.0 millimeter and a length of 21.6 feet. This tube has a length-to-internal diameter ratio of about 6,584:1. It will be apparent that a tube having different dimensions may be employed if a different lubricant is to be used or the pressure available to force the lubricant through the tube is changed. For a tube of given dimensions, the lubricant, viscosity and specific gravity may be selected to provide the desired flow rate under various pressure conditions.

In a typical application of apparatus including a flow restrictor tube for supplying a lubricant to a rock bit at low flow rates over extended periods, a sub containing a lubricant reservoir is connected in the drill string above the bit. A free-floating piston actuated by the drilling fluid circulated through the sub or a similar system for displacing lubricant from the reservoir is provided. The flow restrictor tube is mounted in the lower portion of the sub so that fluid displaced from the reservoir must pass through it. Connecting passageways extend from the outlet of the restrictor tube to passageways in the bit. These in turn extend downwardly through the legs of the bit to outlets at the ends of the bearing pins. The sub is arranged so that drilling fluid can be circulated around the reservoir and associated elements and discharged through the bit nozzles in the normal manner. The use of a lubricating sub of this type provides an effective means for lubricating the bearings of the bit. Similar apparatus may be employed for lubricating the bearings of other tools located in inaccessible places.

The nature and objects of the invention can be more fully understood by referring to the following detailed description of a lubricator sub used to supply grease to the bearings of a two-cone rock bit and to the accompanying drawing, in which.

Figure 1:
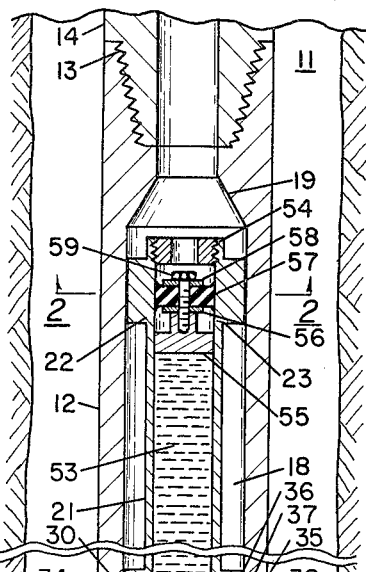
FIGURE 1 is a vertical elevation, partially in section to show internal details, of a lubricating sub containing a flow resistor tube and an attached rock bit.

The lubricating sub and bit shown in FIGURE 1 of the drawing are positioned in a borehole 11 which extends downwardly from the earth's surface. The sub depicted includes a tubular housing constructed in two sections. Upper housing section 12 is provided with internal threads 13 to form a standard A.P.I. tool joint box near the upper end of the apparatus. This is used to connect the sub to a conventional drill collar 14 or other drill string tubular member. Connecting means other than an A.P.I. tool joint may be employed if desired. The lower housing section 15 is connected to the upper section by means of threads 16. An A.P.I. tool joint box including threads 17 or similar connecting means is located near the bottom of the lower section for connecting the sub to a drill bit or other apparatus requiring lubrication. A longitudinal passageway including an intermediate portion 18 of enlarged diameter bounded by shoulder 19 in the upper section and shoulder 20 in the lower section extends through the sub to permit the circulation of drilling fluid. The use of a housing having two sections as described facilitates assembly and disassembly of the apparatus but is not essential.

An elongated tubular member or lubricant barrel 21 is positioned in the enlarged intermediate portion 18 of the housing passageway. The barrel is provided with external flanges which extend longitudinally on the outer barrel surface at intervals about its periphery. Flanges 22, 23, 24 and 25 are located near the upper end of the barrel and serve to center it in the upper housing section. These are shown more clearly in FIGURE 2 of the drawing. The flanges near the lower end of the barrel, flanges 26, 27, 28 and 29 as shown in FIGURE 3 of the drawing, also center the barrel in the housing. In addition, two of these flanges, designated by reference numerals 26 and 27, are somewhat thicker than the others and are used to support the barrel. Threaded plugs 30 and 31 extend through openings in the housing wall into similar openings in flanges 26 and 27 and thus longitudinal movement of the barrel within the housing is avoided. Other means for mounting the barrel in the housing may be utilized.

Plug 30 interconnecting the barrel and housing contains an axial passageway 32 communicating with a lateral passageway in the barrel wall through which fluid may be withdrawn from the barrel. A ball 33 used to close the passageway is held in place by screw 34 in the plug. Plug 31 is provided with a similar passageway 35 containing a spring 36 and ball 37 which act as a check valve. This permits the injection of lubricant into the barrel before the tool is lowered into the borehole. Screw 38 is used to close the passageway during operation of the tool.

Threaded plug 39 and 40 are located near the lower end of the lubricant barrel and extend through threaded opening in the lower housing section into similar openings in flanges 26 and 27. Plug 39 includes passageway 41 and preferably contains a ball 42 and a spring 43. The ball and spring form a check valve which permits the flow of lubricant from the barrel but prevents flow in the opposite direction. The plug terminates within the wall of the lower housing section. A passageway 44 extends longitudinally from within the wall opening adjacent the end of the plug to an outlet in a groove 45 below the thread on the lower section. A wrench recess 46 in plug 39 provides means for easy removal of the plug.

Plug 40 is similar to plug 39 and includes a passageway 47 which preferably contains spring 48 and ball 49. These are also arranged to form a check valve which will permit the discharge of lubricant from the barrel but prevent backflow. Lubricant passing the valve flows through passageway 50 into the groove at the bottom of the sub. Wrench recess 51 provides means for easy removal of plug 40. A seal 52 of rubber, plastic or similar material prevents the escape of fluid from groove 45 into the annulus.

The upper part of the lubricant barrel contains lubricant reservoir 53. An annular plug 54 is threaded into the barrel at the top of the reservoir. Below this is located a free-floating piston comprising a body 55, a lower plate 56, a sealing member 57 of rubber or other resilient material, an upper plate 58, and a bolt 59 which extends into the body through the plates and sealing member in order to hold them in place.

In the lower part of the lubricant barrel is a restrictor tube assembly including an elongated flow restrictor tube 60 surrounded by a plastic, soft metal or similar material 61 which prevents damage to the tube and facilitates handling it. As pointed out earlier, the tube will normally have a length-to-internal diameter ratio in the range between about 1,000:1 and about 10,000:1. The inner diameter of the tube will normally be from about 1.0 to about 3.0 millimeters. In order to conserve space, it is generally preferred to arrange the tube in a tight coil as shown. The coil and surrounding material 61 thus form a cylindrical body which can readily be removed from the barrel when it is desired to change the tube. Seal rings 62 and 63 are set in grooves in the outer surface of the tube assembly in order to effect a seal between the assembly and the inner wall of the barrel. This necessitates that lubricant displaced by the piston in the upper end of the barrel pass through the flow restrictor tube. A screen 64 is positioned above the tube assembly to break up any lumps or air bubbles which might be present in the lubricant and would otherwise tend to plug the tube. The tube assembly shown rests upon an annular spacer 65 containing wall openings through which lubricant discharged from the tube may pass into plugs 39 and 40. The spacer is held in place by threaded plug 66 in the bottom of the barrel. In some cases it may be preferred to eliminate the seal rings and spacer by bonding the tube assembly to the inner wall of the barrel above the discharge plugs 39 and 40. This simplifies the construction of the lubricating sub in some respects but makes it more difficult to replace the tube assembly in the sub. If a tube assembly bonded to the barrel is employed, it may be preferred to provide a threaded joint in the barrel above the assembly so that the entire lower portion of the barrel can be replaced.

The drill bit connected to the lower end of the lubricating sub in FIGURE 1 is a two-cone rock bit provided with a body 67 containing an internal passageway 68 through which drilling fluid is circulated to discharge nozzles not shown in the drawing. Pins 69 and 70 on the lower part of the body support cones 71 and 72 by means of internal bearing assemblies. The assemblies shown include roller bearings 73 and 74, ball bearings 75 and 76, and sleeve bearings 77 and 78. Bearings of this type are currently used on commercial rock bits but other bearing arrangements may be employed. Passageways 79 and 80 extend from openings on the bit shank to outlets in the ends of the pins. Lubricant fed into groove 45 between the lubricating sub and bit flows through the passageways into the spaces surrounding the bearings. It will be apparent that the lubricating sub disclosed may be utilized with bits other than the two-cone roller bit shown. Any rock bit may be lubricated by means of the sub by simply drilling passageways through the body and pins to provide for flow of the lubricant. In like manner, the sub may be used for lubricating the bearings of turbines, reamers and other downhole tools.

Figure 2:
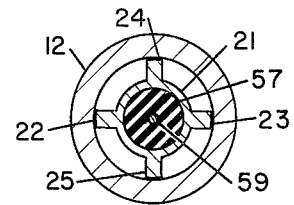
FIGURE 2 is a cross-section through the apparatus of FIGURE 1 taken about the line 2—2.
Figure 3:
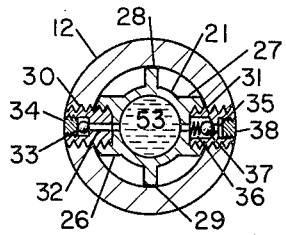
FIGURE 3 is a cross-section of the apparatus shown in FIGURE 1 taken about the line 3—3.

In utilizing the apparatus shown in FIGURES 1 through 3 of the drawing, the lubricant reservoir 53 within lubricant barrel 21 is first filled with a suitable lubricant. The lubricant used is not critical and will depend in part upon the conditions under which the bearings to be lubricated are to operate. In general, however, it is preferred to employ a fluid lubricant rather than a stiff grease. Most greases are plastic materials which will not flow through an elongated tube of small diameter until the pressure drop exceeds a certain value proportional to the yield value of the grease. Above the critical pressure drop, the grease will tend to flow with increasing rapidity because the apparent viscosity declines with increasing sheer rate. This makes it somewhat more difficult to obtain controlled flow rates under laminar flow conditions but does not prevent the use of such greases. In most cases a number of lubricants of different viscosities will be employed under various conditions. The lubricant selected for a particular operation will depend primarily upon the viscosity required to achieve the desired flow rate with the restrictor tube available.

To fill the lubricant reservoir, lubricant remaining from earlier operations may be first displaced by removing screw 34 and ball 33 from plug 30 and forcing the piston assembly downwardly in the lubricant reservoir. This will displace substantially all of the lubricant above the flow restrictor tube assembly. The remaining lubricant in the reservoir can then be removed, if desired, by removing the tube assembly from the barrel and washing the apparatus with a solvent. This is seldom necessary. After the piston has been moved to a position near the restrictor tube assembly, the ball and screw are replaced in plug 30. Screw 38 is then removed from plug 31 and fresh lubricant is injected into the barrel. The fresh lubricant must be injected under sufficient pressure to open the check valve in the plug and move the piston upwardly in the barrel. The screw 38 is replaced after the barrel has been filled and the lubricating sub is connected into a rotary drill string between the lowermost drill collar and the drill bit as shown in FIGURE 1 of the drawing. The assembled apparatus is then lowered into the borehole and the drilling operation is commenced. Drilling fluid is circulated downwardly through the drill string and passes downwardly about the lubricant barrel to the drill bit. The pressure within the barrel will be substantially greater than that in the borehole annulus due to the pressure drop across the bit nozzles. Since the pressure within the cones is about the same as that in the annulus, the pressure available for lubrication purposes is approximately equal to the drop across the nozzles.

The force exerted by the drilling fluid on the upper surface of the piston causes the piston to slowly move downwardly in the lubricant reservoir as drilling progresses. The space above the piston fills with drilling fluid. The downward movement of the piston forces the lubricant in the reservoir through screen 64 where any lumps or air bubbles present are broken up. The lubricant then passes slowly through the restrictor tube. The material discharged from the tube passes through the check valves in plugs 39 and 40 into passageways 44 and 50 of the sub. Lubricant in the passageways flows into the annular groove 45 between the sub and bit and then passes through passageways 79 and 80 to the bearings of the bit. The oil or other lubricant fed into the bearing enclosures at the ends of the pins flows through the bearings and is discharged into the borehole between the cones and the legs of the bit. This constant flow at extremely low rates prevents the backflow of drilling mud containing abrasive solids into the bearings and thus significantly reduces bearing wear.

Because of the slow flow rates through the restrictor tube, an adequate supply of lubricant during the entire bit run is assured. The flow rates employed generally range between about 30 and about 1500 cubic centimeters per hour. A lubricant reservoir capacity of about 2.2 cubic feet will permit a 100 hour bit run at a 600 cubic centimeter per hour flow rate. This means that the lubricating sub need be of only moderate size and can be readily installed in conventional rotary drill strings without difficulty. Lubricating devices proposed in the past have been capable of supplying lubricant for very short periods but have not been practical where prolonged operation is contemplated.

Figure 4:
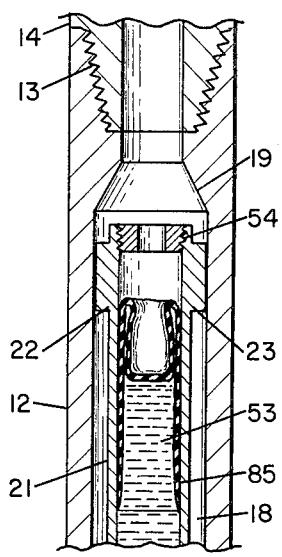
FIGURE 4 is a fragmentary view of the lubricating sub showing an alternate method for displacing lubricant from the lubricant reservoir.

The apparatus described in conjunction with FIGURES 1 through 3 of the drawing may be modified as shown in FIGURE 4 to permit the use of a rolling diaphragm in place of a free-floating piston. FIGURE 4 is a fragmentary view showing the upper end of the lubricating sub with the diaphragm in place. The lower end of the diaphragm 85 is bonded to the inner wall of the lubricant barrel 21. The diaphragm extends upwardly inside the barrel and is displaced downwardly within itself by drilling fluid entering the barrel through the opening in annular plug 54 at the top of the barrel. Other parts of the apparatus of FIGURE 4 are identical to those of the sub shown in FIGURE 1 and are identified by the reference numbers employed earlier. This use of a rolling diaphragm to displace the lubricant assures an effective seal between the drilling fluid and lubricant.

Figure 5:
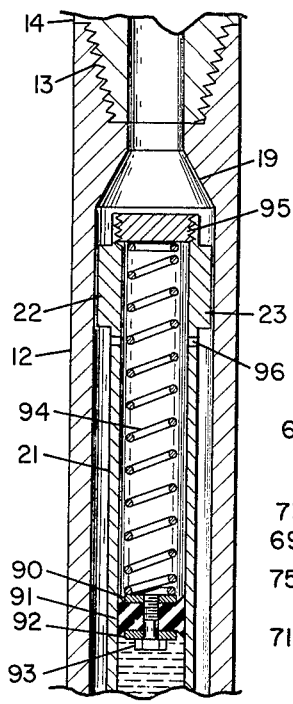
FIGURE 5 is a fragmentary view of the sub showing another means for displacing lubricant from the lubricant reservoir.

FIGURE 5 of the drawing is a fragmentary representation of still another embodiment of the invention. Here a spring-operated piston rather than fluid pressure is utilized to displace the lubricant from the reservoir. The piston assembly includes an upper plate or body 90, a sealing member 91 of rubber or similar material, a lower plate 92, and a bolt 93. The bolt extends through the lower plate and sealing member into the upper plate to hold the elements together. A helical spring 94 positioned above the piston forces it downwardly in the barrel to displace the lubricant through the flow restrictor tube. The spring is secured at its upper end by plug 95 which is threaded into the top of the barrel. An opening 96 is provided in the wall of the barrel to permit the entry of fluid as the piston moves downwardly. Fluid thus entering the barrel will assist the spring. The arrangement shown in FIGURE 5 permits the discharge of lubricant into the bearings of the bit or similar device even though fluid is not circulated to the device. It may also be employed in drilling operations where a high pressure drop across the nozzles is not available.

Figure 6:
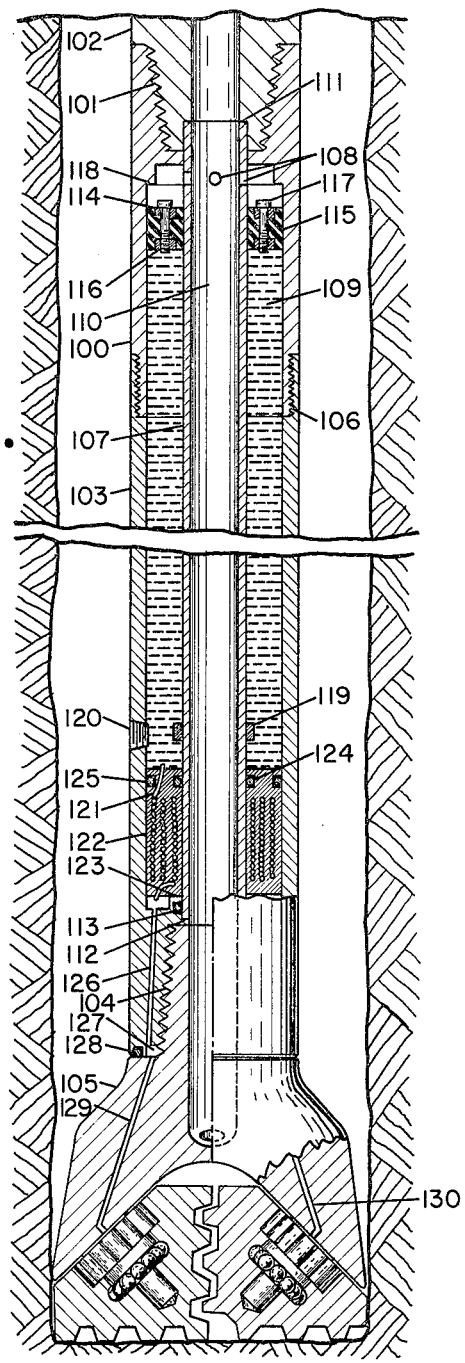
FIGURE 6 is a vertical section view of still another embodiment of the invention.

FIGURE 6 of the drawing depicts still another embodiment of the invention. The apparatus shown in FIGURE 6 includes an upper housing section 100 provided with threads 101 for connecting the upper section to a rotary drill string 102 and a lower housing section 103 having threads 104 for attaching a rotary bit 105 or other apparatus including bearings which require lubrication. The two sections are connected by threads 106. A tubular member 107 containing lateral openings 108 near its upper end is mounted within the housing to form an annular lubricant reservoir 109 and an axial passageway 110 extending through the housing. The tubular member is held in place at its upper end by shoulder 111 in the upper housing section and by shoulder 112 in the lower section. An O-ring or similar member 113 set in a groove in the lower section above the shoulder provides a seal between the housing and tubular member. An annular piston comprising upper plate 114, sealing member 115, lower plate 116, and bolt 117 is positioned within the reservoir below openings 108. Shoulder 118 on the upper housing section limits upward movement of the piston and prevents blockage of the openings. A ring 119 welded or otherwise attached to the outer surface of the tubular member in the lower housing section limits downward movement of the piston. Filler plug 120 is threaded into an opening in the housing wall below the ring 119 to permit the injection of lubricant into the reservoir below the piston.

Elongated tube 121 surrounded by plastic, soft metal or similar material 122 is seated in the annular space between the lower housing section and the tubular member below the reservoir. The tube is arranged in a tight coil to conserve space and communicates with the reservoir. The internal diameter of the tube is between about 1.0 and about 3.0 millimeters and the length-to-internal diameter ratio is between about 1000:1 and about 10,000:1. The tube assembly seats upon an annular shoulder 123 above seal 113 and is provided with inner and outer O-rings 124 and 125 to prevent leakage of lubricant past it. A passageway 126 extends from below the tube assembly to an internal groove 127 at the bottom of the lower housing section. This groove communicates with passageways 129 and 130 in the bit or other tool. O-ring 128 provides a seal between the lubricating sub and tool outside the groove.

The apparatus of FIGURE 6 is employed in much the same manner as the apparatus described earlier. The force exerted by drilling fluid entering the reservoir through openings 108 in tubular member 107 causes the piston to move downwardly, thus displacing lubricant through elongated tube 121. Because of the pressure drop through the tube, the required low flow rate is obtained. The lubricant discharged from the tube flows through passageway 126, and groove 127 into communicating passageways 129 and 130 in the bit or other tool. The relatively large diameter of the elongated tube prevents plugging due to sand grains, scale particles and other foreign matter present in the system. A screen may be installed above the tube assembly to remove any air bubbles or lumps in the lubricant if desired.

It will be understood that the apparatus disclosed above is not limited to the lubrication of rock bits as illustrated in the drawing and may be employed for supplying a lubricant to the bearings of downhole turbines, reamers, and other tools at the bottom of a borehole and in other applications where it is essential to supply a lubricant at low flow rates to a bearing between a fixed structure and a rotatable member mounted thereon.

What is claimed is:

1. In a rotary drill string including a rotary bit having a cutting element mounted on a bearing and a lubricating sub containing a lubricant reservoir for supplying lubricant to said bearing, said rotary bit and lubricating sub including a passageway extending therethrough for the discharge of drilling fluid against the bottom of a borehole, the improvement which comprises:
   (a) a tube assembly mounted in the lower part of said lubricant reservoir in said lubricating sub, said assembly including a protective material sealed in contact with the walls of said reservoir and an elongated tube having an internal diameter between about 1.0 and about 3.0 millimeters and a length-to-internal diameter ratio between about 1000:1 and about 10,000:1 embedded within said protective material, said elongated tube having an inlet in the upper surface of said protective material communicating with said reservoir and an outlet in the lower surface of said protective material communicating with the outlet of said reservoir;
   (b) means within said reservoir and said lubricating sub above said tube assembly for displacing said lubricant from the upper part of said reservoir through said elongated tube; and
   (c) means in said lubricating sub and bit for conveying lubricant from the lower part of said lubricating reservoir below said tube assembly to said bearing.

2. Apparatus as defined by claim 1 wherein said elongated tube is arranged in the form of a coil within said lubricating reservoir in said lubricating sub.

3. Apparatus as defined by claim 1 wherein said means for displacing lubricant through said elongated tube includes a piston longitudinally slidable within said lubricant reservoir above said tube assembly.

4. Apparatus as defined by claim 1 wherein said means for displacing lubricant through said elongated tube includes a flexible, impervious diaphragm mounted in said lubricant reservoir in said lubricating sub above said tube assembly.

5. A lubricating sub comprising:
   (a) a tubular housing including means at one end for connecting said housing to a drill string and means at the other end for connecting said housing to apparatus requiring lubrication;
   (b) a tubular member concentrically mounted within said housing, said tubular member and the inner wall of said housing defining an axial passageway through said housing and an annular lubricant reservoir surrounding said passageway;
   (c) an annular tube assembly positioned within said reservoir, said assembly including an elongated, coiled tube having an internal diameter between about 1.0 and about 3.0 millimeters and a length-to-internal ratio between 1000:1 and about 10,000:1, a protective material in which said elongated tube is embedded, and means for maintaining seals between the inner and outer surfaces of said protective material and the adjacent surfaces of said housing and said tubular member, said elongated tube having an inlet in the upper surface of said protective material communicating with said reservoir and an outlet in the lower surface of said protective material;

(d) an annular piston slidably mounted in said reservoir above said tube assembly for displacing lubricant from said reservoir through said elongated tube;

(e) means for introducing a fluid under pressure into said reservoir above said piston; and, (f) means for conveying lubricant from said outlet of said elongated tube to said apparatus requiring lubrication.

6. A lubricating sub comprising:

(a) a tubular housing including means at one end for connecting said housing to a drill string and means at the other end for connecting said housing to apparatus requiring lubrication;

(b) a tubular member concentrically mounted within said housing, said tubular member and the inner wall of said housing defining a lubricant reservoir, an inlet at the upper end of said housing and a passageway extending through said housing;

(c) a piston longitudinally slidable within said lubricant reservoir below said inlet;

(d) a tube assembly positioned in said reservoir below said piston including an elongated, coiled tube having an internal diameter between about 1.0 and about 3.0 millimeters and a length-to-internal diameter ratio between about 1000:1 and about 10,000:1, a protective material within which said tube is embedded, and means for maintaining a seal between said protective material and the adjacent reservoir wall, said elongated tube having an inlet in the upper surface of said protective material communicating with said reservoir and an outlet in the lower surface of said protective material; and, (e) means communicating with said outlet of said tube for conveying lubricant to said apparatus requiring lubrication.

References Cited by the Examiner

UNITED STATES PATENTS

| | | | |
|---|---|---|---|
| 1,453,875 | 5/1923 | Hughes | 175—228 |
| 1,501,482 | 7/1924 | Hughes | 175—228 |
| 1,576,370 | 3/1926 | Scott | 175—228 |
| 1,622,843 | 3/1927 | Price et al. | 138—42 |
| 1,641,273 | 9/1927 | Hughes | 175—228 |
| 1,779,428 | 10/1930 | Grant | 138—42 |
| 2,481,705 | 9/1949 | Whitney | 138—42 |
| 2,578,711 | 12/1951 | Martellotti | 308—122 |
| 2,728,415 | 12/1955 | Le Clair | 184—7 |
| 2,905,444 | 9/1959 | Shepard | 175—227 X |
| 3,007,750 | 11/1961 | Cunningham | 175—227 X |
| 3,007,751 | 11/1961 | Eenink | 175—227 X |
| 3,017,937 | 1/1962 | Bobo | 175—228 |
| 3,029,881 | 4/1962 | Swart | 175—228 |

FOREIGN PATENTS

| | | |
|---|---|---|
| 177,476 | 3/1920 | Great Britain. |

CHARLES E. O'CONNELL, *Primary Examiner.*